Oct. 11, 1960  E. E. ANDERSON  2,955,661
POLAR COORDINATE CONTROL FOR CYCLOIDAL PROPELLERS
Filed Jan. 23, 1958  4 Sheets-Sheet 1

INVENTOR
EMIL E. ANDERSON
BY Ralph L. Bassett
ATTORNEY

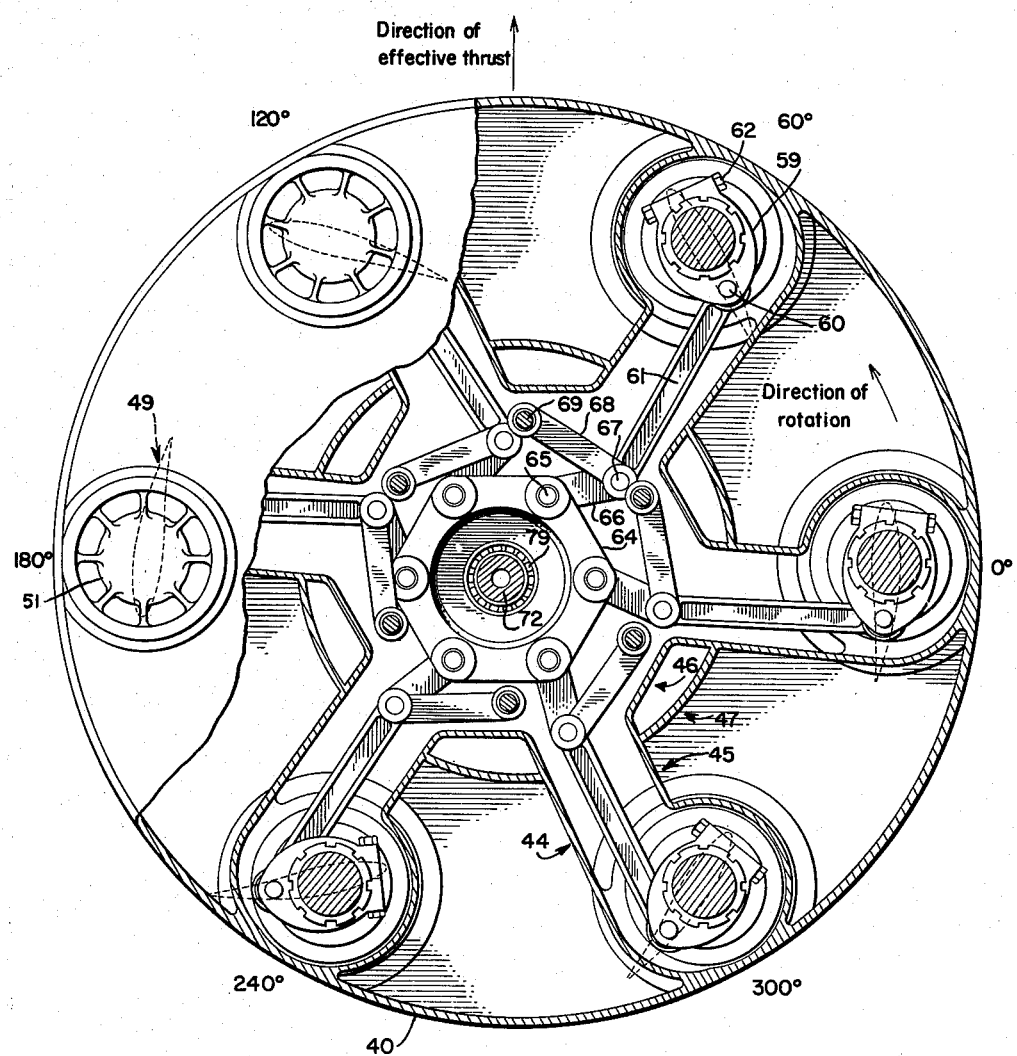

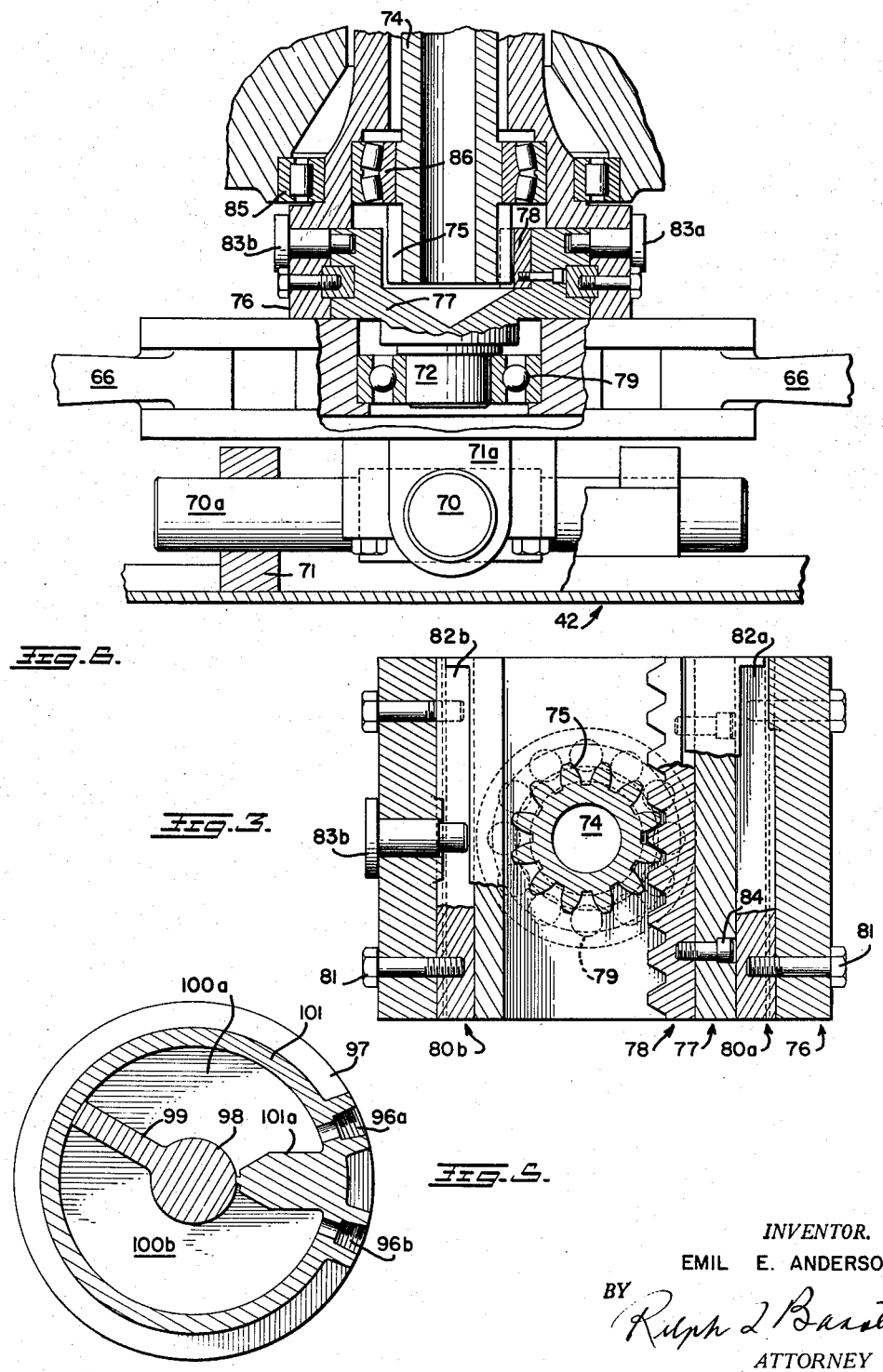

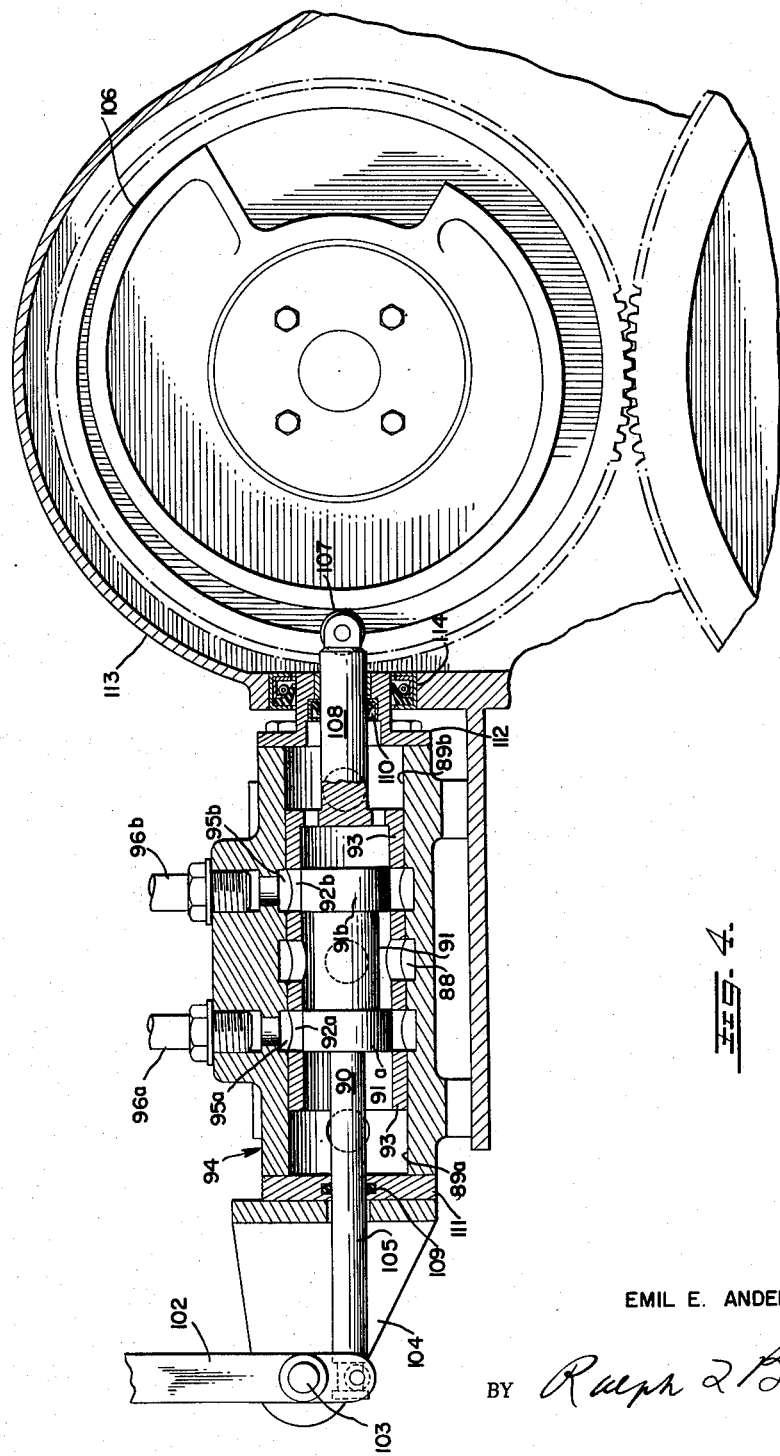

United States Patent Office 2,955,661
Patented Oct. 11, 1960

2,955,661

POLAR COORDINATE CONTROL FOR CYCLOIDAL PROPELLERS

Emil E. Anderson, Seattle, Wash., assignor to Pacific Car and Foundry Company, Renton, Wash.

Filed Jan. 23, 1958, Ser. No. 710,771

3 Claims. (Cl. 170—148)

This invention relates to cycloidal propellers in which steering and pitch variation is governed by the polar coordinates of a central control pivot. Radial excursion or increased eccentricity of the pivot increases the effective pitch; the orientation of the radial excursion is uniquely related to the direction in which thrust is effected, which provides a steering control. My invention provides an improved system for controlling the polar coordinates of such a pivot, whereby variations in angular orientation or steering can be executed independently of variations in radial excursion or pitch angle.

In an application of cycloidal propellers to propulsion of marine vessels, a flat cylindrical rotor drum is set flush with a region on the undersurface of the hull and is powered by the ship's engines. Symmetrically arrayed about the periphery, a plurality of flat driving blades are rotatably mounted about axes generally perpendicular to its surface. In rotation of the disk, thrust is produced on each blade by constraints which cause it to execute properly phased departures from tangency with respect to the orbital path of each blade. In propellers of the present type, these departures constitute an angular oscillation about the position of tangency rather than a continuous rotation about it, so that unique leading and trailing edges of the blades are defined and a more efficient asymmetrical blade section may be employed. Each blade repeats a given pitch oscillation cycle each time the rotor turns through a complete revolution. In general, this oscillation provides that a hydrodynamic pressure be applied to the inward surface of a blade in its path forward of a line through the central axis perpendicular to the direction of net thrust effort, and on the outer surface in its path aftward of such a line.

Pitch variation is controlled by linkages inside the rotor disk which connect crank arms attached to the axis of each blade to a central pivot assembly. If this pivot assembly is centered on the axis of the rotor disk, the blades remain tangent to the disk periphery. Displacement of the pivot assembly a distance off-center in a given direction causes blades forward of a line through the pivot at a given angle to the displacement direction to execute a positive pitch variation and receive thrust against their inward surface; blades rearward of this line execute negative pitch variation and receive thrust on their outer surface. The net result is a thrust in a direction uniquely related to the angular orientation of the pivot-assembly displacement. The magnitude of the pitch variation will be directly related to the magnitude of the eccentricity of the control pivot.

The flexibility of control afforded by cycloidal propellers provides two important advantages to a ship's helmsman not realized with the more conventional helical screw propellers. First, the full thrust can be exerted in any direction with respect to the ship, giving unusual qualities of maneuverability and effectiveness of steering. Second, the pitch can be varied at will to suit conditions of load, desired speed, and engine capacity, giving optimum performance and efficiency over a wide range of operating conditions.

Successful attainment of these advantages is contingent upon a practical system of independently variable controls for radial excursion (pitch) and circumferential positioning (steering) of the control pivot assembly. For control systems in which both steering and pitch shafts are operated with reference to the fixed structure attached to the ship's hull, however, independent control cannot be inherent in the mechanism. As an example of this difficulty consider the mechanism for control pivot positioning wherein the pivot is affixed to a slider in a rectilinear track attached to a vertically disposed steering shaft. Nested within the steering shaft, a pitch control shaft drives a pinion which in engaging a rack affixed to the pivot carrying slider can vary the radial excursion of the control pivot. Since the line of action between pinion and rack is eccentric to the center of the steering shaft, a rotation of the steering shaft without a corresponding rotation of the pitch control shaft will result in a displacement of the rack or a change in the eccentricity of the control pivot, just as, conversely, a rotation of pitch control pinion alone will effect pitch variation.

This difficulty is overcome in the present invention by interposing a servo motor for the pitch control directly between the steering shaft and the pitch control shaft. A rotary servo motor is provided which is sufficiently compact to permit mounting between the two shafts, so as to allow its rotation as a whole with respect to the stationary propeller-housing or hull of the ship. This servo motor then acts to produce relative motion between pitch and steering shafts. The difference between the angular rotation of the steering shaft and that of the pitch shaft is sensed on the fixed housing by a screw type differential to furnish the feedback signal for the control valve in a hydraulic servo system. The steering shaft along with the intercoupled pitch control shaft is rotated by another rotary servo attached to the rotor housing fixed in the hull of the ship.

It is the primary object of my invention to provide the helmsman of a vessel with a propulsive and steering means of maximum flexibility and simplicity of control.

More specifically, the object of my invention is to provide an improved system for independent angular and radial positioning of a control pivot for a cycloidal propeller.

Another object of the invention is the utilization of rotary servo motors to affect relative motion between two concentric shafts, independent of the rotation of both shafts with respect to the supporting housing.

It is another object of my invention to provide a means for sensing of the difference between the rotation of two shafts on a fixed housing, independent of the sum of the rotations which both shafts execute in common with respect to said housing.

Another object is the provision of independent controls for cycloidal propellers in which the pitch control force is directly applied without the use of extensive gearing.

Yet another object is to provide a mechanism of a cycloidal propeller control of basic simplicity, ruggedness, and reliability which is unlikely to fail even after long usage under severe service conditions.

These and other objects of my invention will become more apparent from the following description when taken together with the drawings, in which corresponding components are designated by identical reference characters.

Fig. 2 is a plan view of pitch control pivot assembly and propeller-connecting linkages;

Fig. 3 is a section along line 3—3 of Fig. 1 showing a cut-away view of the pitch control rack and pinion assembly for effecting radial displacement of the control pivot assembly;

Fig. 4 shows a detailed section of the steering-position feedback cam and control valve for the rotary steering-servo-motor;

Fig. 5 shows a sectional view of a rotary servo motor of the type used for steering or pitch control; and Fig. 6 shows an enlarged view taken from Fig. 1 in the region of the control pivot.

Figure 1:
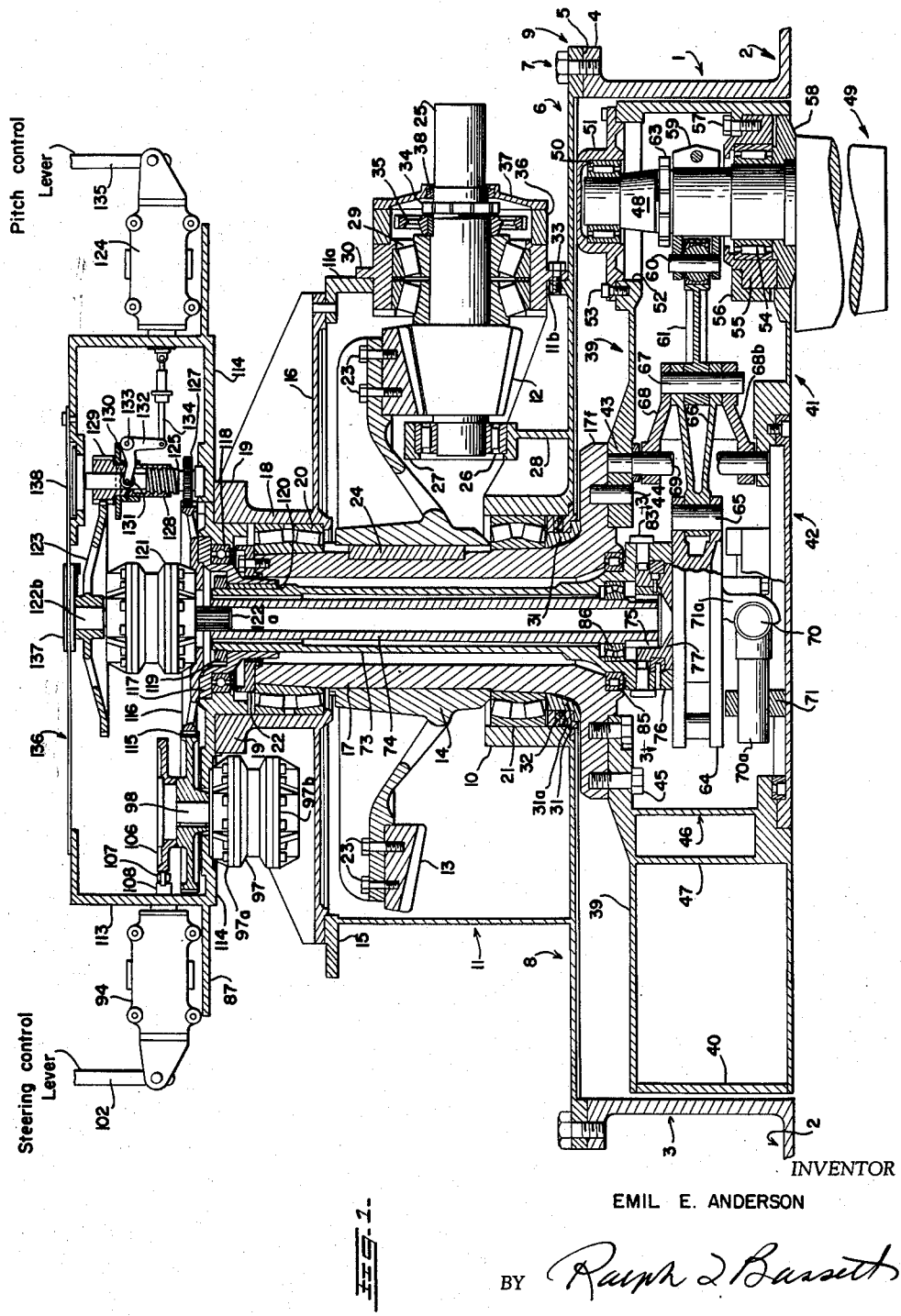
Fig. 1 shows a sectional elevation through the centerline of the propeller showing the essential elements of the driving and pitch control systems.

In propellers of the present type, the propulsive power is applied to a blade bearing rotor which is generally set flush with the bottom of a ship and rotated about an axis perpendicular thereto. This axis of rotation is thus essentially perpendicular to the output shaft of the usual marine power plant, which is horizontally disposed. The necessary right angle drive is effected by a beveled spiralled pinion gear driven by the ship's power plant, enmeshed in a mating beveled ring gear attached to the blade bearing rotor. In addition to changing the axis of rotation, the gearing provides speed reduction or torque magnification between the ship's power plant output shaft and the propeller rotor.

For installation of the present propeller, the ship's hull is provided with a cylindrical well designated by reference character 1 being integrally joined to the ship's bottom 2 with wall partition 3 extending inward generally perpendicularly thereto. Radially extending from the top of wall structure 3, the flange 4 provides a flat planar ring 5 upon which the propeller housing 6 is mounted. Attachment of housing 6 to ring flange 5 is accomplished by a radially arrayed plurality of bolts 7 (one of which is shown in Fig. 1) threaded into flange 4 and extending through corresponding holes in the circumferential flange 9 of housing 6.

The housing 6 provides a base for the rigid structure necessary to support the two sets of journals permitting (1) rotation of the blade bearing rotor about a vertical axis and (2) of the power input shaft about a horizontal axis connected to the ship's power plant. It consists generally of a flat circular disk 8 bounded on the outer periphery by a downward extending thickened region heretofore designated as flange 9, and on an inner aperture by an upwardly extending concentric cylinder 10. Midway between these limits, cylindrical enclosure 11 rises vertically, being of a diameter sufficient to house a beveled ring gear 13, and sufficiently high to clear the vertical extremities of the ring gear hub 14. Extending radially outward from the uppermost end of cylindrical enclosure 11 integrally attached circular flange 15 provides additional rigidity to cylinder 11 as well as a flat mounting surface for the gear box cover 16. The gear box cover 16 extends the stationary housing based upon disk 8 inward from the upper flange of cylindrical enclosure 11 to a central aperture therein provided to accommodate the main rotor shaft. The central aperture is extended upward by cylindrical housing 18 which is rimmed at the top by integral flange 19. The components mounted atop flange 19 pertain to the steering and pitch control system and will be described in later paragraphs.

The primary loads borne by the stationary structure heretofore described are imposed onto the inside of cylinders 10 and 18 which serve as recesses for anti-friction bearings which support the main rotor shaft 17. Of these, the upper bearing 20 is bounded external to its outer race by the inner surface of cylinder 18, while the lower bearing 21 is correspondingly bounded by cylinder 10. Retainer ring 22 bolted atop shaft 17 secures the inner race of bearing 20. The bearings 20 and 21 are shown as double-tapered roller bearings which can support both radial and/or axial loading. Free to rotate about a vertical axis as constrained by bearings 20 and 21, the main rotor shaft 17 consists of a thick walled hub-like member extending between journal positions 20 and 21 integrally splayed out to form a thick circular flange 17f at its lowermost extremity below journal position 21. The thick flange 17f provides a mounting surface for the blade carrying rotor to be described later. Sea water is prevented from entering the gear box bounded by cylindrical closure 11 by means of ring member 31 providing a cylindrical bearing surface 31a and seal 32.

Torque is transmitted to rotor shaft 17 by the action of beveled pinion gear 12 enmeshed in beveled ring gear 13 which in turn is attached with bolts 23 to hub 14, which in turn is secured by key 24 to shaft 17. Pinion 12 is carried on shaft 25 which is driven by the ship's power plant. The inboard extremity of shaft 25 is of reduced diameter so as to shoulder against the inside diameter of roller bearing 26. Support for bearing 26 on the stationary housing 6 is provided by a cylindrical ring 27 recessed to fit the outer race of bearing 26. Ring 27 is integrally connected to disk 8 by supporting web structure 28.

The generally cylindrical shape of gear enclosure 11 is modified about the entry region for shaft 25 so as to provide suitable attachment surfaces 11a and 11b for the outboard bearing 29 supporting power input shaft 25. In Fig. 1 a central section of a thickened portion of housing 11 is shown, providing a flat vertical surface of lateral breadth sufficient to seat the circular shoulder on a bearing holder 30 and with a circular aperture cut therein to receive the body diameter of bearing holder 30. Bearing holder 30 is secured to seat 11a and 11b by means of a plurality of bolts 33, one of which is shown in Fig. 1. Tightness of the outboard pinion bearing 29 may be adjusted by setting nut 34 which is threaded on shaft 25 and applies pressure to the inner race of bearing 29 through sleeve 35. Cylinder housing 36, end cap 37 and oil seal 38 are provided to retain lubricant in bearing 29 as well as to prevent entry of dirt, water or other foreign matter.

The structure thus far described defines a cylindrical well recessed in the bottom of a ship bounded by side walls 3 and top cover 6. The flange 17f is positioned adjacent to the top cover and may be rotated by direct gearing to the ship's power plant. All of the power transmitted from the ship's power plant to the propeller blades appears at the flange 17f and is transferred to the propeller blade shanks by the rotor structure attached thereto which is now to be described.

The rotor structure has the external appearance of a cylindrical drum, generally bounded on its upper surface by disk 39, on its outer circumference by cylinder wall 40 and below by disk 41 and bottom cover plate 42. The upper disk 39 is bounded at a central aperture by a flange 43 of increased thickness so as to allow adequate strength for the more highly loaded regions near the hub. Accurate positioning (centering) of disk 39 onto hub 22 is assured by pin 44, and mounting is completed with a plurality of radially distributed bolts 45, two of which are shown at the left in Fig. 1. The rotor box is internally compartmented with vertical partitions as shown in Fig. 2 with wall 47 defining a circular central compartment which is accessible by removing bottom cover plate 42. Six times replicated walls 44, 45 and 46 define enclosures for each set of the six linkages which control propeller orientation.

The propeller blades are cantilevered about axles pivoted in symmetrically disposed peripheral locations in the rotor drum. For the present application six blades are disclosed by way of example, although it is obvious that other numbers of blades greater than one are possible. One of the six blade assemblies is shown in Fig. 1 in which shaft 48 is shown as an integrally formed extension of propeller blade 49. Since the maximum bending moment in shaft 48, due to hydrodynamic forces on the blade, is at the lower journal, a tapered shaft can be employed to advantage. The upper and thus smaller of the two bearings 50 is recessed in a cap 51 which in turn is seated in a circular recess 52 provided at the appropriate circumferential position in disk 39. Bolts 53 serve to fasten cap 51 to the recess 52. The lower bearing 54 is retained in a circular ring member 55, which in turn is seated in a cylindrical recess formed as an integral well 56 in the lower disk 41 of the rotor, and secured there by bolts 57. Cover member 58 seals the bottom of the blade shaft assembly against entry of water.

In addition to supporting the bending moment imposed by hydrodynamic forces on blade 49, shaft 48 must also transmit torsional couple to effect cyclic variation in angular orientation of each blade during rotor revolution. In the present system this control torque is imposed by a crank arm 59 connected via a pivot 60 to connecting rod 61. The crank arm is clamped onto shaft 48 with nut and bolt 62 (see Fig. 2) and is vertically positioned thereon by abutment against adjusting nut 63 which is threaded on shaft 48.

The linkage by which blade orientation is varied from a position of tangency to the rotary path of the blade axle is best viewed in Fig. 2 taken in conjunction with Fig. 1. The linkage is chosen to effect a blade motion which is more nearly cycloidal and thus hydrodynamically more ideal for propellers of this type. Each of the six times replicated linkage trains may be seen in Fig. 2 to be linked to a central, hexagonal, multiple pivot, control plate 64. Control plate 64 is attached to a double slider mechanism which permits its translation to variable positions of eccentricity with respect to rotor center, but prevents any rotation with respect to the rotor. The mechanism accomplishing this constraint consists of two right angled tracks 70 and 70a formed as a unit of two intersecting circular cylinders (Fig. 1). One track 70 is constrained to axial movement with respect to a pair of sliders 71 (one shown) fixed in the rotor cover plate 42. The other track 70 slides in similar sliders 71a formed as an integral part of the lower surface of control plate 64.

Fixing the orientation of plate 64 means that any radial excursion imposed upon a central control pivot 72 (Fig. 2) will be followed by a parallel and equal displacement of each of the pivot points 65. Pivot 65 fixes one point of intersection in a triangle composed of fixed legs 66 and 68 interconnected by pivot 67. The other end of leg 68 is fixed in the rotor housing at pivot 69. The connecting rod 61 to the propeller crank 59 is also pivoted about pivot 67. It is the radial component of the arcuate path of pivot 67 about fixed pivot 69 which is effective in modifying the orientation of the blade 49. It will be noted from Fig. 1 that linkages 66 and 68 are actually forked double arms to provide a balanced loading of pivots in the linkage assembly. They function as single links of length as shown in the plan view of Fig. 2.

Minimum deviation from tangency must occur as each blade arrives at the station transverse to the direction of net thrust effort. In Fig. 2 this is seen to be the case for the blades at 0° and 180° with a control pivot excursion along the 240° radius vector. Variation in the angular orientation of the control pivot will produce a directly corresponding change in the direction of effective thrust. It is also apparent from the case considered in Fig. 2, that the greater the radial eccentricity of pivot 72 and plate 64, the greater the angular variation, or pitch change which blades fore and aft of the transverse axis are constrained to execute in a pattern repetitive with each revolution of the rotor.

The problem of controlling the effective pitch and effective thrust direction of propellers of this type, then, is that of controlling the radial eccentricity and angular orientation of pivot 72 with respect to the center of the propeller rotor. For this reason the present system is referred to as polar coordinate control. In the present propeller, this location of the control pivot is fixed by a rack and pinion mechanism now to be described. It will be noted from Fig. 1 and Fig. 6 that the main hub or shaft 17 for the rotor drum is hollow, permitting two additional hollow shafts to be nested within its central cavity. Of these two shafts, the outer one 73 carries a generally centered horizontal track 76 at its lower extremity while the inner shaft 74 carries a pinion gear 75 (Fig. 3). A slider 77 is movable on track 76 and carries the control pivot 72 as an integral cylindrical boss protruding from the center of its lower surface through the control plate 64. A roller bearing 79 is inserted between control pin 72 and control plate 64 (Fig. 2). Details of the rack and pinion are best shown by the plan view of Fig. 3, taken in conjunction with the elevation view of Fig. 6. The lower end of outer control shaft 73 is of lateral dimension sufficiently large to form a generally rectilinear, horizontally disposed slot as an outer housing for the slider. A keyed track is provided by elongated, square sectioned, track runners 80a and 80b fastened with bolts 81 to either side of slotted member 76. The slider 77 is provided with a mating profile to match that of the track assembly 76 and 80. Additional elongated recesses 82a and 82b are provided along opposite outer sides of slider 77 to receive retaining pins 83, thereby providing positive limit to the linear excursion possible with the slider 77. The gear rack 78 is fastened to one side of the slider interior with bolts 84 and extends generally parallel to the track direction.

In operation of the propeller, rotation of the rack carrying control shaft 73 is limited to about the 180° needed to provide thrust effort in any direction. The rotor shaft 17 revolves continuously around shaft 73. Low friction of relative motion between the two is provided by roller bearing 85. Another roller bearing 86 centers pitch control shaft 74 within steering shaft 73 bearing the reaction of the net forces applied to the control pin 72 through the various linkage assemblies.

Control torques for the steering shaft 73 and pitch shaft 74 are applied from the upward ends of these shafts which protrude through the top of the drive shaft 17. In propellers of large size, considerable torque is required to execute rotation of the control shafts so that power assists are practically essential. Furthermore, although the movements of steering and control shafts are independent, the torque applied to the pitch adjusting shaft is directly transmitted to the steering shaft. If direct manual control of steering were employed, the operator would be required to exert a countering force to maintain a given heading when he chose to vary the pitch. Thus, the present servo system, in addition to being naturally suited to independent control of two shafts, is necessary to isolate control force reactions from the operator.

The rotational-position control system consists essentially of a rotary servo motor (an expansible chamber type is illustrated), a control valve, and a mechanical feedback linkage from the servo motor to the control valve. The valve contains two concentric sliding elements, and when these elements are in a certain relative position, equal pressure is applied to both sides of the motor piston and no motion results. When one element is displaced an amount proportional to a desired displacement of the motor, excess pressure will be channeled to one side of the motor piston. This condition will continue to exist until the second element of the servo valve is displaced into registry with the first. This displacement is accomplished through the feedback loop which mechanically couples the servo motor piston so as to produce a proportional movement of the second valve element. Thus, when the servo motor has moved an amount which, through the feedback loop, corresponds to the displacement set in by the first control element, the control elements are again brought into registry and the servo motor stops.

The servo motors and control valves for both steering and pitch control systems are identical. Only the position sensing feedback loop devices for each are different. Power to operate the servo motors is supplied from a suitable source of fluid under pressure (not shown) to servo valve 87 (Fig. 4) and to centrally located high pressure cavity 88. A low pressure return to the pressure source is connected to exhaust cavity 89a and 89b endwise located in the valve body. The pressure differential between cavities 88 and 89 appears across enlarged cylindrical shoulders 91a and 91b of inner valve 91. A hollow cylindrical sleeve 93, closely fitted to the outside of cylindrical shoulders 91a and 91b, is provided with radial ports 92a and 92b of longitudinal dimension just equal to the length of shoulders 91a and 91b and in longitudinal registry therewith. An outer casing 94 provides an outer cylinder in which sleeve 93 is free to slide. The ports 92a and 92b are connected by annular grooves 95a and 95b recessed in the inner surface of casing 94, to pressure lines 96a and 96b. The pressure lines lead directly to opposing sides of a double acting hydraulic motor 97, as shown in Fig. 5.

In the motor a shaft to be controlled is connected to hub 98 and is driven by the pressure differential appearing across a vane member 99. The expansible chambers 100a and 100b are bounded at one end by fixed partition 101a projecting radially inward to seal against hub 98, and separating the pressure entry ports 96a and 96b. A cylindrical casing 101 forms an outer boundary upon which the outermost edge of vane 99 may slide. On the top and bottom, smooth cover plates 97a and 97b (see Fig. 1) serve to seal the vane 99 and complete the enclosure of expansible chambers 100a and 100b. Leakage of fluid across the sliding surfaces of the vane 99 is minimized by suitable seals (not shown). In operation, application of increased pressure to chamber 100a from port 96a will cause a counterclockwise rotation of hub 98 and whatever is connected to it, while a higher pressure in chamber 100b will reverse the rotation.

The valve 87 is shown in Fig. 4 in its equilibrium position. This equilibrium will be upset by any relative motion of ported sleeve 93 with respect to shouldered inner valve 91. In the usual case, the desired position of the servo motor is set into the servo valve by the longitudinal position of inner valve 91 as effected by the operator's setting of lever 102. The lever 102 has a fulcrum at pivot 103 set in bracket 104 so as to effect longitudinal displacement of connecting rod 105. If, for example, a counterclockwise rotation of servo motor 97 from the equilibrium position is desired, the upper end of lever 102 would be moved to the right, thus displacing valve shoulders 91a and 91b to the left. The high pressure source will thus become connected to collector groove 92a and line 96a while the low pressure return will be connected to collector groove 92b and line 96b. Fluid under pressure will flow out of line 96a to enlarge chamber 100a, pushing the vane 99 counterclockwise. An equal flow from contracting chamber 100b will return via line 96b.

Movement of vane 99, if equilibrium is thus upset, will continue until the outer sleeve 93 is correspondingly displaced into registry with inner valve 91. This movement is accomplished by a mechanical feedback loop. A linear cam 106 is directly connected to the hub 98 of the servo motor. Each angular position of vane 99 will produce a corresponding longitudinal position of outer sleeve 93 riding on the cam through roller 107 and rod 108. Thus each linear position of lever 102 will have a corresponding equilibrium position of the servo motor 97, and while equilibrium is upset, the servo motor will be driven in a sense so as to restore equilibrium.

The servo valve 97 could be operated with high pressure and return ports reversed. This would, however, impose unnecessary pressure upon sliding seals 109 and 110, which are mounted in end plates 111 and 112, respectively. The body of servo valve 87 is entered into the cam housing 113 through another seal 114.

The servo system above described represents the steering control means for the present propeller. The housing of servo motor 97 is mounted on an upper extension 114 of the stationary housing. In addition to the feedback cam 106, servo motor shaft 98 also carries a gear 115 which is directly enmeshed with another gear 116, which in turn is directly attached to the steering shaft 73 through collar member 117. A ball bearing 118 centers collar member 117 and the shaft 73 at the top with respect to the fixed housing. A nut 119 vertically positions collar member 117 on shaft 73, while key 120 prevents rotational motion therebetween.

For the pitch control shaft 74, it is desired to effect a control of relative motion between shaft 74 and steering shaft 73, independent of the motion of the latter with respect to the fixed housing. The rotary servo motor described in connection with Fig. 5 is suited for this purpose, as its compact outer housing is of a form readily adaptable to direct mounting upon the rotor shaft, or its extension as formed in the hub of gear 116. The servo motor 121 shown in Fig. 1, being so mounted, is provided with a double ended output shaft. The lower end 122a is splined to insert into a corresponding internal spline provided in shaft 74, while to the upper end 122b is attached a gear 123 of pitch diameter identical to that of steering shaft gear 116.

The servo feedback loop for servo motor 121, which is controlled through another valve 124 similar to valve 94, should produce a displacement uniquely related to differences in the rotational positions of gear 123 with respect to gear 116. This difference is detected by a screw type differential. A threaded bolt member 125 is journaled in the fixed housing 114 and is rotated by steering shaft gear 116 enmeshed in a gear 127 forming an integral part of its lower extremity. A nut member 128 is threaded on the bolt and is driven by pitch shaft gear 123 enmeshed in an integrally formed gear 129. Gears 129 and 127 are of equal pitch diameter. It is apparent that the vertical position of nut 128 will be a unique function of the relative positions of the steering and pitch shafts, their movement in unison effecting no vertical movement while rotation of either nut 128 or bolt 125 alone does produce a vertical movement. The vertical displacement of nut 128 correspondingly displaces a flanged collar 130 which acts on abutting roller 131 carried by angled lever 132 which is pivoted about fulcrum 133 fixed with respect to the housing 114. Connecting rod member 134 attaches the remaining end of lever 132 to the servo valve 124. In a manner similar to that for steering control lever 102, a pitch control lever 135 is provided to position an inner valve member. Action of servo motor 121, which is sensed at the valve 124 through the screw differential, positions an outer (port-bearing) sleeve member of valve 124 which is identical to sleeve 93 of valve 87. Independent control of pitch and steering control can thus be carried out by simple positioning of the respective control levers 135 and 102.

A cover plate 136 is provided for top housing 113 and windows 137 and 138 allow visual inspection of the positions of pitch and steering control shafts.

The servo valves are shown in Fig. 1 to be mounted at opposite position on the top housing 113. While these locations are desirable for purposes of illustration, it should be apparent that a more compact arrangement of functionally similar components would be possible without departing from the scope of the present invention.

The arrangement as described and illustrated is obviously not dependent upon the rotary servo motor of the expandible chamber type. Rotary motion as required to position the pitch and steering shafts can be obtained from a multitude of mechanisms actuated hydraulically, pneumatically, or electrically. The uniqueness to this invention lies not in the use of a particular actuator but in the adaption of an actuator of sufficiently small envelope to make possible its imposition between the steering and pitch shafts, and basically rotatable with the steering shaft.

What I claim is:

1. A cycloidal propeller comprising a tubular drive shaft rotatably mounted in a structure to be propelled, a rotor attached to one end of the drive shaft, a plurality of propeller blades rotatably mounted on said rotor, a blade control assembly, linkage connecting each propeller blade to the blade control assembly, positioning pivot means for said blade control assembly, polar coordinate control means for said positioning pivot whereby the effective pitch is varied as the radial excursion of the pivot means from the axis of the tubular drive shaft, while the direction of thrust is varied as the angular orientation of the pivot means, said control means including a carriage attached to the pivot means, a track upon which said carriage is constrained to linear motion in a direction generally perpendicular to the axis of the tubular drive shaft, a tubular steering control shaft attached to the track and rotatably mounted within the tubular drive shaft, a steering position servo motor mounted on the structure to be propelled and having output means connected to drive the steering control shaft, a steering control valve mounted on the structure to be propelled and connected to said steering servo motor, a source of fluid pressure connected to said steering control valve, a primary control element in said valve, means for positioning said primary control element in correspondence with the desired direction of thrust, a follow-up control element in said steering control valve for arresting the steering servo motor when said follow-up control element is displaced into registry with said primary control element, a cam driven by the said servo motor, a follower for said cam, means connecting said follow-up control element to the cam follower, whereby the position of said follow-up control element is varied in correspondence with the rotation of said steering servo motor and thus of the angular orientation of the positioning pivot, a gear rack attached to said carriage, a spur gear engaging said rack, a pitch control shaft carrying said gear at one end and rotatably mounted in said tubular steering control shaft, a pitch position servo motor directly mounted on the steering control shaft having output means connected to drive the pitch control shaft.

2. A cycloidal propeller comprising a tubular drive shaft rotatably mounted in a structure to be propelled, a rotor attached to one end of the drive shaft, a plurality of propeller blades rotatably mounted on said rotor, a blade control assembly, linkage connecting each propeller blade to the blade control assembly, positioning pivot means for said blade control assembly, polar coordinate control means for said positioning pivot whereby the effective pitch is varied as the radial excursion of the pivot means from the axis of the tubular drive shaft, while the direction of thrust is varied as the angular orientation of the pivot means, said control means including a carriage attached to the pivot means, a track upon which said carriage is constrained to linear motion in a direction generally perpendicular to the axis of the tubular drive shaft, a tubular steering control shaft attached to the track and rotatably mounted within the tubular drive shaft, a steering position servo motor mounted on the structure to be propelled and having output means connected to drive the steering control shaft, a gear rack attached to said carriage, a spur gear engaging said rack, a pitch control shaft carrying said gear at one end and rotatably mounted in said tubular steering control shaft, a pitch position servo motor directly mounted on the steering control shaft having output means connected to drive the pitch control shaft, a pitch control valve mounted on the structure to be propelled, flexible tubes connecting said pitch control servo motor to said pitch control valve, a source of fluid pressure connected to said pitch control valve, a primary control element in said valve, means for positioning said primary control element in correspondence with the desired pitch of the propeller, a follow-up control element in said pitch control valve whereby the pitch servo motor will be arrested when said follow-up control element is displaced into registry with said primary control element, a screw member rotatably mounted in said structure to be propelled and geared to rotate with said steering control shaft, a nut member threaded on said screw member and rotatably geared to said pitch control shaft, whereby displacement of the nut along the shaft will occur in proportion to the difference between the rotational displacements of the steering control shaft and the pitch control shaft, a follower for said nut, means connecting said follow-up control element to the follower for said nut, whereby the position of said follow-up element is varied in correspondence with the relative rotation between said pitch control shaft and said steering control shaft, and thus of the radial excursion of the positioning pivot.

3. A cycloidal propeller comprising a tubular drive shaft rotatably mounted in a structure to be propelled, a rotor attached to one end of the drive shaft, a plurality of propeller blades rotatably mounted on said rotor, a blade control assembly, linkage connecting each propeller blade to the blade control assembly, positioning pivot means for said blade control assembly, polar coordinate control means for said positioning pivot whereby the effective pitch is varied as the radial excursion of the pivot means from the axis of the tubular drive shaft, while the direction of thrust is varied as the angular orientation of the pivot means, said control means including a carriage attached to the pivot means, a track upon which said carriage is constrained to linear motion in a direction generally perpendicular to the axis of the tubular drive shaft, a tubular steering control shaft attached to the track and rotatably mounted within the tubular drive shaft, a steering position servo motor mounted on the structure to be propelled and having output means connected to drive the steering control shaft, a steering control valve mounted on the structure to be propelled and connected to said steering servo motor, a source of fluid pressure connected to said steering control valve, a primary control element in said valve, means for positioning said primary control element in correspondence with the desired direction of thrust, a follow-up control element in said steering control valve for arresting the steering servo motor when said follow-up control element is displaced into registry with said primary control element, a cam driven by the said servo motor, a follower for said cam, means connecting said follow-up control element to the cam follower, whereby the position of said follow-up control element is varied in correspondence with the rotation of said steering servo motor and thus of the angular orientation of the positioning pivot, a gear rack attached to said carriage, a spur gear engaging said rack, a pitch control shaft carrying said gear at one end and rotatably mounted in said tubular steering control shaft, a pitch position servo motor directly mounted on the steering control shaft having output means connected to drive the pitch control shaft, a pitch control valve mounted on the structure to be propelled, flexible tubes connecting said pitch control servo motor to said pitch control valve, a source of fluid pressure connected to said pitch control valve, a primary control element in said valve, means for positioning said primary control element in correspondenc with the desired pitch of the propeller, a follow-up control element in said pitch control valve whereby the pitch servo motor will be arrested when said follow-up control element is displaced into registry with said primary control element, a screw member rotatably mounted in said structure to be propelled and geared to rotate with said steering control shaft, a nut member threaded on said screw member and rotatably geared to said pitch control shaft, whereby displacement of the nut along the shaft will occur in proportion to the difference between the rotational displacements of the steering control shaft and the pitch control shaft, a follower for said nut, means connecting said follow-up control element to the follower for said nut, whereby the position of said follow-up element is varied in correspondence with the relative rotation between said pitch control shaft and said steering control shaft, and thus of the radial excursion of the positioning pivot.

References Cited in the file of this patent

UNITED STATES PATENTS

| | | | |
|---|---|---|---|
| 1,870,674 | Ehrhart | | Aug. 9, 1932 |
| 2,015,514 | Ehrhart | | Sept. 24, 1935 |
| 2,045,233 | Kirsten et al. | | June 23, 1936 |

FOREIGN PATENTS

| | | | |
|---|---|---|---|
| 98,660 | Sweden | | Apr. 16, 1940 |
| 59,764 | Netherlands | | Aug. 15, 1947 |
| 858,370 | Germany | | Dec. 4, 1952 |
| 860,466 | Germany | | Dec. 22, 1952 |